United States Patent [19]

Rucci et al.

[11] Patent Number: 4,737,857
[45] Date of Patent: Apr. 12, 1988

[54] OVERHEAD DOCUMENT SCANNER LIGHTING AND SCANNING APPARATUS

[75] Inventors: Norman M. Rucci, Howell; Helmuth O. Sautter, Middletown; Donald B. Swicker, Wall Township, Monmouth County, all of N.J.

[73] Assignees: American Telephone and Telegraph Company, New York, N.Y.; AT&T Information Systems Inc., Morristown, N.J.

[21] Appl. No.: 57,127

[22] Filed: Jun. 1, 1987

[51] Int. Cl.$^4$ .......................................... H04N 1/028
[52] U.S. Cl. ................................ 358/294; 358/213.13; 358/293
[58] Field of Search ............... 358/294, 293, 280, 285, 358/213.13, 75

[56] References Cited

U.S. PATENT DOCUMENTS

| | | | |
|---|---|---|---|
| 4,220,978 | 9/1980 | Rhyins et al. | 358/293 |
| 4,250,526 | 2/1981 | Fuwa et al. | 358/294 |
| 4,352,128 | 9/1982 | Ohori et al. | 358/294 |
| 4,636,081 | 1/1987 | Saitoh | 358/75 |
| 4,639,608 | 1/1987 | Kuroda | 250/578 |
| 4,642,679 | 2/1987 | Nagano | 358/75 |
| 4,652,913 | 3/1987 | Saitoh | 358/75 |
| 4,658,289 | 4/1987 | Nagano | 358/75 |
| 4,658,303 | 4/1987 | Nagano | 358/75 |
| 4,670,779 | 6/1987 | Nagano | 358/75 |
| 4,691,228 | 9/1987 | Nagano | 358/75 |

FOREIGN PATENT DOCUMENTS

| | | |
|---|---|---|
| 52-44113 | 4/1977 | Japan . |
| 53-68020 | 6/1978 | Japan . |
| 57-148465 | 9/1982 | Japan . |

*Primary Examiner*—Howard W. Britton
*Attorney, Agent, or Firm*—John A. Caccuro

[57] ABSTRACT

An overhead optical scanner is disclosed which uses commerical 60 Hz AC powered fluorescent lighting apparatus to illuminate the scanned objects. The image sensor of the scanner operates at a line scan rate which is in sync with the 60 Hz rate. The image sensor integrates the variations in illumination intensity received from the object over one complete 60 Hz cycle, thereby producing an electrical signal which is characteristic of a uniformly illuminated object.

8 Claims, 4 Drawing Sheets

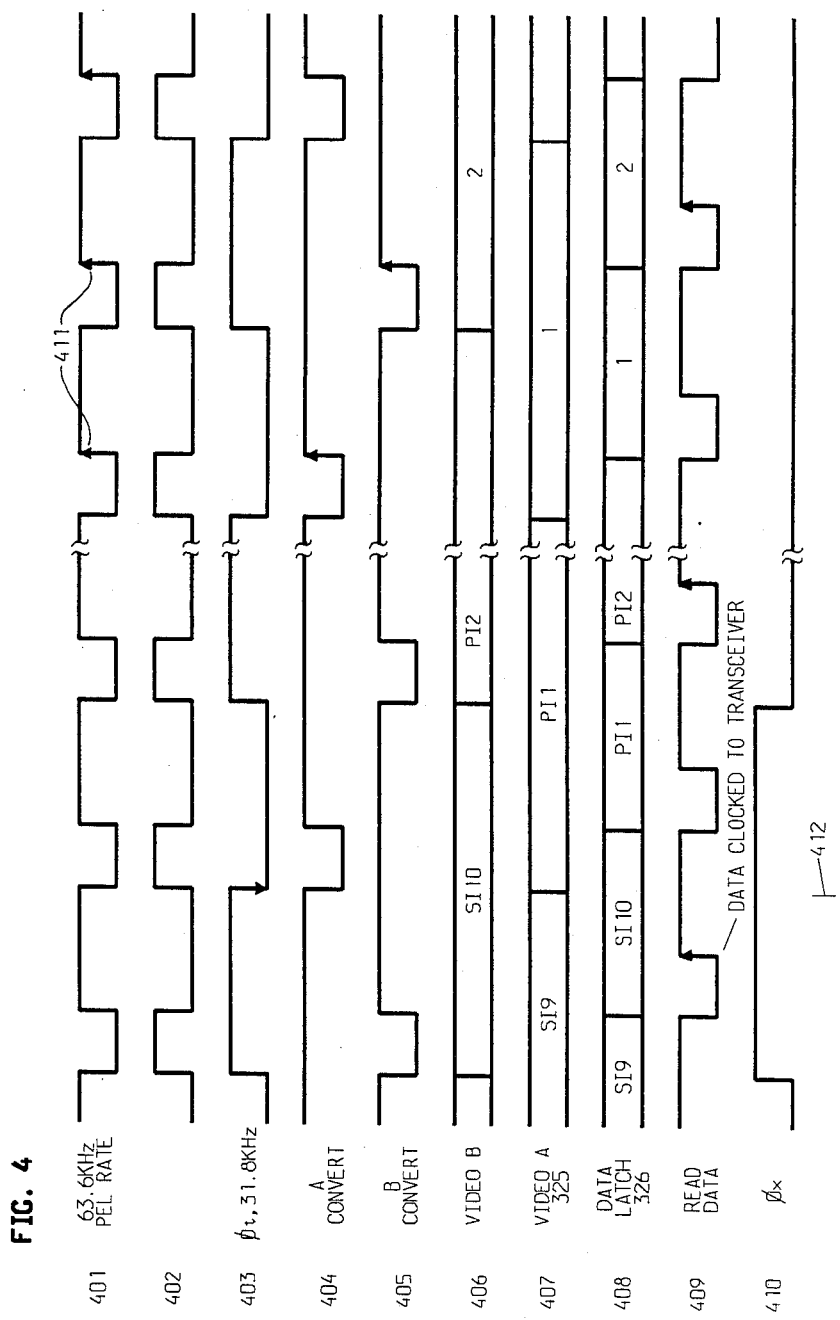

OVERHEAD DOCUMENT SCANNER LIGHTING AND SCANNING APPARATUS

TECHNICAL FIELD

This invention relates to an overhead document scanner and, more particularly, to lighting and scanning apparatus therefor.

BACKGROUND OF THE INVENTION

Conventional 60 Hz AC powered fluorescent lighting arrangements are not used in document scanners because of the non-uniform lighting which results. Consequently, existing document scanners often require an expensive and bulky power supply to power the document illumination apparatus. One common type of illumination arrangement uses direct current (DC) powered fluorescent light bulbs to provide uniform lighting of documents for the scanner. However, DC powered fluorescent bulbs must be periodically reversed or they do not last long. Moreover, the DC supplies are costly.

Another lighting arrangement utilizes a high-frequency power supply to provide uniform lighting. Such an arrangement, however, tends to be costly, noisy, inefficient, and require expensive bulbs. What is needed is a low-cost, efficient and uniform lighting arrangement for a document scanner.

SUMMARY OF THE INVENTION

In accordance with the present invention, a document scanner uses a commercial AC powered fluorescent lighting apparatus and an image sensor array which is operated in sync with the commercial AC to produce electrical scan signals indicative of a uniformly illuminated document. The document is line scanned in sync with the frequency of the commercial AC (i.e., 60 Hz) using an integrating multiple element image sensor array. Because the charge build-up on the photo-elements is integrated over one complete 60 Hz AC line voltage cycle, the variation in the illumination caused by the 60 Hz commercial power source is eliminated. In one embodiment, the scanner clock operates independently of the commercial 60 Hz AC but at a frequency which is a multiple of the 60 Hz rate.

BRIEF DESCRIPTION OF THE DRAWING

The invention will be more clearly understood from a consideration of the following detailed description of the illustrative embodiment of the invention and the accompanying drawing in which:

FIG. 4 shows a timing diagram of signals useful in describing the invention.

DETAILED DESCRIPTION

Figure 1:
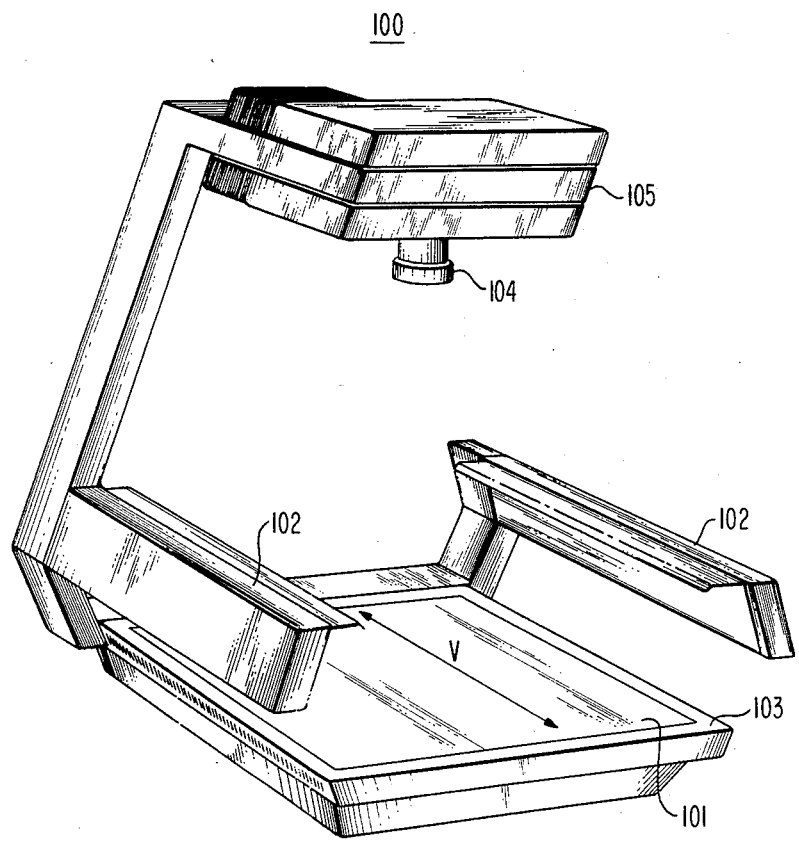
FIG. 1 is a pictorial representation of an illustrative overhead image scanner useful in describing the present invention.

Referring now to FIG. 1, there is shown an image scanner 100 for producing a digital image of an object which may be a document containing, for example, graphic designs, notes, charts or test. The target area 101 is illuminated from above by light sources in 102 for nontransparent objects and from below in base 103 for transparent objects. Translation of picture information from the document to video signal levels is done by a stepper-driven image sensor (linear array of photodiodes) located in the scanner head (105). The array is electrically scanned horizontally as it is mechanically stepped through the plane of image height (V).

The scanner includes open space between a lens housing 104 and the target area 101 to permit interaction with the document by a user. These documents are scanned while face up (right reading) to further enhance the interaction. This type scanner is therefore designed to encourage the use of visual displays in teleconference-type meetings but requires special signal conditioning in normal operation because the documents are exposed to room illumination during the scanning process. The room illumination would typically be provided by lamps which utilize commercial 60 Hz power.

Figure 2:
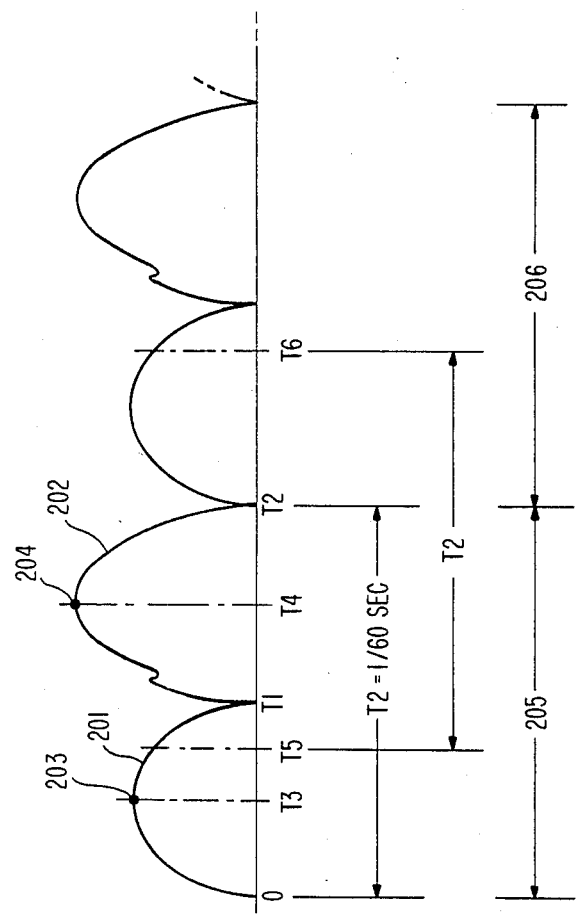
FIG. 2 illustrates the periodic intensity variations generated by a 60 Hz AC powered illumination apparatus utilized in accordance with the invention.

With reference to FIG. 2, a fluorescent light source 102 in accordance with the present invention utilizes commercial 60 Hz power. While the disclosed embodiment utilizes commercial 60 Hz power, the present invention may be adapted to operate at 50 Hz or other power frequency rates or in general using electrical power which varies in any periodic manner. Because commercial 60 Hz power is used to operate the light source 102, the illumination intensity would vary at a 60 Hz rate. That is, one complete cycle 0-T2 would take about 0.166 milliseconds (ms). One-half of a cycle, 0-T1, would be about 0.083 ms. FIG. 2 shows repetitive cycles in which the illumination intensity level 203 of the first half of the cycle, e.g., 0-T1, does not reach the level 204 reached by the second half of the cycle. The first and second halves (i.e. 201, 202) of the illumination cycle are in response to the positive and negative halves of the 60 Hz power applied to light source 102. It is typical that when a fluorescent light source is utilized as the light source, the intensity varies from almost no illumination (at T0) to full illumination (at T3), and also that the peak illumination for each half of cycle may not be the same (e.g., 203, 204). Moreover, the shape 201 and 202 of each half of a cycle may not always be the same. These variations may be caused by variations in the commercial 60 Hz power or by characterisitics of the fluorescent lamps. However, from cycle to cycle (203, 204, etc), the illumination intensity repeats fairly accurately. As will be discussed in a later paragraph, the present invention takes advantage of this repeatability of the illumination cycle by synchronizing the scanning process thereto.

The linear array of photodiodes (image sensor) utilized by the present invention integrates over one 60 Hz cycle the illumination intensity of the image. If the photodiode sensors are turned-on for one complete period or cycle (i.e., 0.166 ms), the accumulated charge thereon resulting from the integration of the illumination intensity will be the same for each cycle. Thus, for example, turning-on the photodiodes during the interval T0-T2 would give the same reading as during T5-T6. This is important since it means that the photodiode scanning operation requires only frequency sync rather than phase sync with the power source. Obviously, if desired, the scanner could be made to operate in phase sync with the 60 Hz power source.

In the following description, each item of each figure has a reference designation associated therewith, the first number of which refers to the figure in which that item is first described (e.g., 101 is located in FIG. 1).

Figure 3:
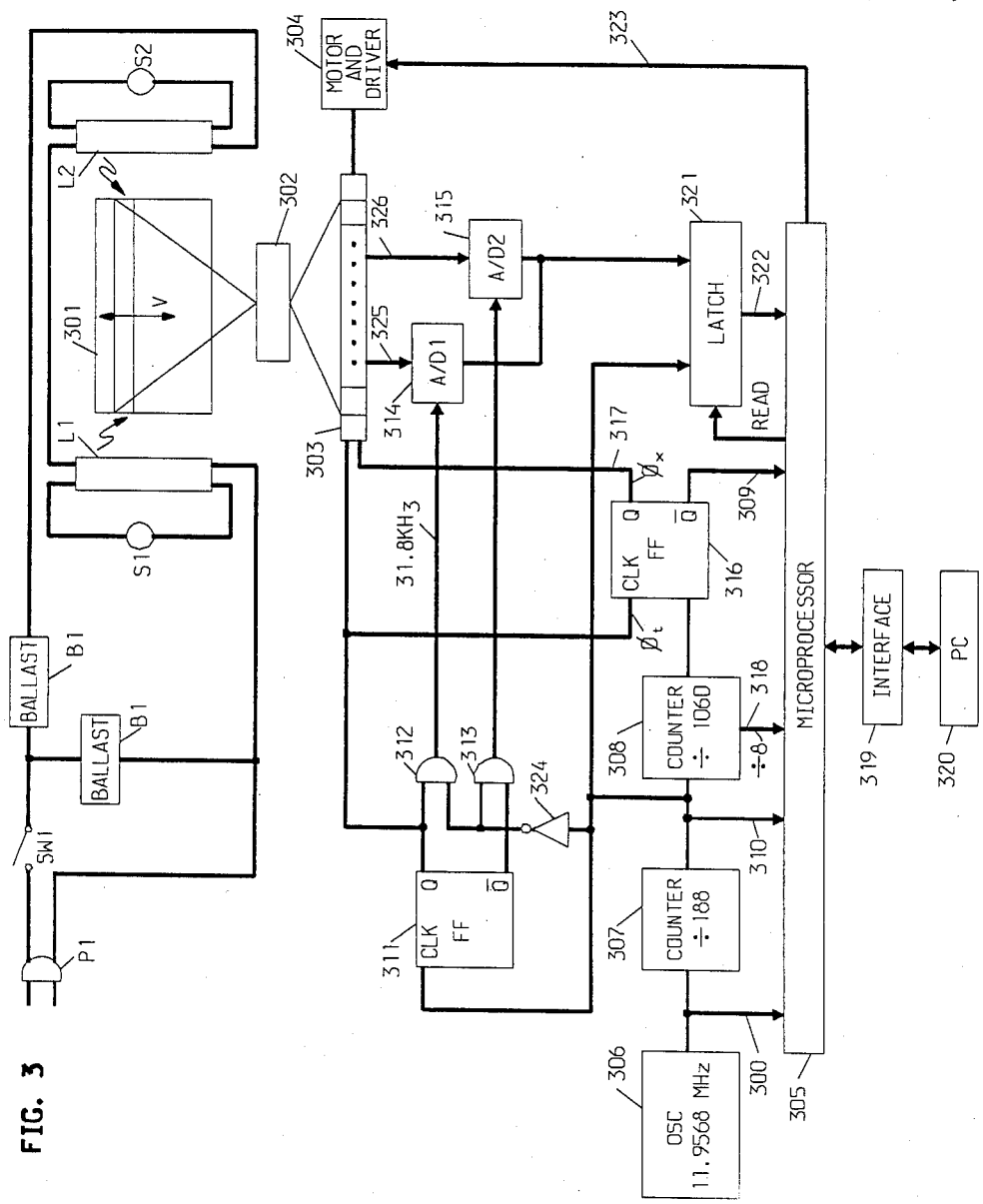
FIG. 3 shows a block diagram of the functional components of the invention.

With joint reference to FIGS. 1, 3 and 4, a more detailed description of the operation of the invention is presented. Fluorescent lamps L1 and L2 represent light source 102 of FIG. 1 and operate in a standard manner using commerical 60 Hz power. Commercial power is connected via plug P1; switch SW1 is the on-off power switch; B1 and B2 are ballast; S1 and S2 are the respective starters for lamps L1 and L2. It should be noted that the circuitry shown in FIG. 2 would be duplicated when both an overhead lighting apparatus for non-transparent objects and a lighting apparatus mounted in the base for transparent objects are provided by the scanner.

In one embodiment, the lamp tubes L1 and L2 may be manufactured with an internal reflective coating between the inner surface of the glass envelope (bulb) and the phosphor coating layer and include a clear slot, or aperture, in the lamps' inner coatings (not illustrated). The slot may extend the full length of the tube and allows some control (by rotating the tube) over the direction in which light is emitted. The lamps may contain a CW (cool white) phosphor to allow proper color balance in the video signal.

The aperture feature allows much of the light produced in the tube to be reflected through, e.g., a 60 degree slot, and directed toward the center of the image area. The loss in light-producing efficiency due to a reduction in the phosphor surface within the aperture slot of the lamp is considered of minor significance.

Lamps L1 and L2 provide illumination to the document 301 located in the image area (101). Lens 302, located in lens housing 104, may be any of a variety of commercially available lenses (e.g., a videcon type lens) selected for the particular focal length and focusing range desired for the scanner. The scanner head (105) is positioned so that image sensor 303 located therein is properly positioned relative to lens 302 and image area (101).

IMAGE SENSOR

Image sensor 303 converts incident light to electric charge, which is integrated over one complete 60 Hz cycle and stored until read-out. The integrated charge is directly proportional to the light intensity impinging upon the photodiodes (photo-elements) of the sensor. Read-out is accomplished by clock pulses 317 so that a charge signal is read into two analog-to-digital (A/D) converters 314, 315. The charge signal is an analog signal representation of the distribution of light intensity along one scan line as detected by image sensor 303.

In the disclosed embodiment, image sensor 303 is a solid state, 1024 element, linear charged coupled device (CCD) sensor, such as CCD133A, manufactured by Fairchild CCD Imaging Division, Palo Alto, Calif. Image sensor 303 is designed for page scanning applications and other applications requiring high resolution and sensitivity. The device contains on-chip circuitry comprising shift registers and amplifiers in addition to the photo elements. Photo element size is 13 micrometers on 13 micrometer centers. The 1024 sensor elements produce an output signal that varies in an analog manner from a minimum level equal to thermally generated noise background at zero illuminution to a maximum or saturation level under bright illumination. Details related to sensor functions (transfer gate, shift registers, amplifiers, and clock circuitry) are available in Fairchild's "CCD—The Solid State Imaging Technology" product line catalog.

STEPPING MOTOR

Image sensor 303 is mounted on a printed circuit board located in scanner head 105. As the scanner head is moved in direction V, the sensor is moved across the image plane behind the lens to achieve line sequential scanning of document 301 in target area (101). A two-phase digital stepper-motor and driver circuit 304 control the stepping of image sensor 303 across the document 301. Incremental rotation of motor-driven screw produces the "vertical" scanning. The motor driver circuit of circuit 304 may be a Motorola SAA1042 integrated circuit which requires step pulses and direction signals from microprocessor 109.

Microprocessor 305 provides video signal processing and status indicator signals. Microprocessor 305 also controls stepper-motor 304 operations and generates step pulses with the proper time relationships to insure uniform light integration time for each video line produced by the image sensor.

In application which require a scan rate greater than 60 scan lines per second, the printed circuit board may be arranged with multiple image sensors 303 to scan multiple lines for each line cycle period, thereby accommodating scan rates of multiples of the 60 scan-lines-per-second rate. For example, one image sensor 303 may be arranged to scan the top half of the image and another image sensor to scan the lower half of the image.

When a greater number of pels per line is required, multiple image sensors 303 may be utilized in series or a larger, appropriatly sized image sensor may be utilized in the arrangement. Obviously, such increased capacity of the scanning apparatus will require appropriate changes in the remaining circuitry in accordance with the present invention.

TIMING CIRCUITS

The scanner's master clock frequency is selected to be an integer multiple of 60 Hz and is provided by a crystal oscillator 306 generating an 11.9568 MHz square wave. This frequency is slightly below the 12 MHz maximum clock rate of microprocessor 305. The 11.9568 MHz clock 300 is fed directly to the clock input of microprocessor 305. This clock is easily divided using binary counters 307 and 308 rephased by flip flop (FF) 316 to provide a 60 Hz line sync rate signal 309 which enables the scanner to use a conventional 60 Hz fluorescent light source for document illumination.

Binary counter 307 divides the master clock frequency by a factor of 188. The resultant 63.6 KHz signal 310 is used to control the A/D converters 314 and 315, data latch 321, and counter 308 and to provide picture element timing 409 to the microprocessor 305. The 63.6 KHz rate represents the picture element (PEL) sample clock for a 1024 PELs per line scan system. The PEL sample clock (63.6 KHz rate), shown in 401, is divided by flip flop 311 to provide a square wave at 31.8 KHz. Both outputs of FF 311 and an inverted 63.6 KHz signal, 402 (inverted by inverter 324), are connected to gates 312 and 313. Gates 312 and 313 produce, respectively, 'A' convt 404 and 'B'convt 405 signals. These signals 404 and 405 cause A/D converter 314 and 315, respectively, to do the A/D conversion on the rising edge 411 of signals 404 and 405. The outputs of A/D converters 314 and 315 are read by data latch 321 on the same rising edge 411 (see 408).

Binary counter 308 provides an additional division factor of 1060. The resultant 60 Hz signal is inputted to flip flop 316 and clocked by $\phi_t$ signal 403 to provide a transfer clock ($\phi_x$) 317 that lasts for one period of the $\phi_t$ signal 403. Transfer clock $\phi_x$ encompasses one falling edge of the $\phi_t$ signal as shown in 410, which is needed to satisfy the timing requirements of the sensor array 303. The line sync signal 309, the $\overline{Q}$ output of FF 316, is an inverted version of $\phi_x$ for use by microprocessor 305. The byte clock signal 318 is derived by dividing the PEL sample clock 310 by a factor of 8. That is, byte clock signal 318 occurs once for every eight picture elements. It is used by microprocessor 305 for data transfer to the hardware interface 319 and to the personal computer 320.

ANALOG TO DIGITAL CONVERSION

Each scanning cycle begins in the middle (i.e., 412) of a transfer clock ($\phi_x$) signal during the negative going edge of signal $\phi_t$ and continues until the middle of the next transfer clock signal (not shown). This time period is equal to one cycle of the 60 Hz signal or 1/60 of a second. During this time period, each photo element of image sensor 303 is integrating the illumination signal received from pels of the object. At time 412, the integrated signal is transferred from the photo-elements into two shift registers internal to the image sensor 303. The outputs video A and video B are the serial outputs of the data from these two registers. With particular reference to 406 and 407 of FIG. 4, the video A and video B signals outputted from image sensor 303 include isolation cell samples which precede (e.g., PI1,PI2) the picture element (pel) samples (e.g., 1, 2) and isolation cell samples which are subsequent (e.g., SI9, SI10) to the pel samples.

Thus, the outputs video A and video B (325, 326) include isolation cell samples in addition to pel samples. Video A signal, 407, contains the odd numbered samples while video B signal, 406, carries the even samples. The two signals are connected via leads 325 and 326, respectively, to the analog inputs of identical A/D converters 314 and 315. Timing signals 'A' convt 404 and 'B' convt 405 start the conversion process for each odd or even picture sample. The tristate outputs of A/D 314 and 315 are latched in latch 211. The data latch signal 310 is generated to coincide with the completion of each odd or even conversion. The latched output 408 is an 8-bit digital representation of each sequential picture element. The digital video signal of data latch 321 is clocked out over bus 322 to an I/O port of the microprocessor 305 using read signal 409. Since microprocessor 305 knows how many isolation cells (PI1, PI2 of 407,406) precede the pels and also knows the number of pels which represent the scanned object, it appropriately processes the data from data latch 321.

MICROPROCESSOR

Microprocessor 305, illustratively an Intel 8751H, controls various functions associated with the overall scanner operation. Microprocessor 305 receives scan parameters and commands from personal computer PC 320 and sends scanner status and digital video signals thereto. Microprocessor 305 uses the PEL sample clock 300 and line sync signal 309 from the master timing circuits to perform a video compensation algorithm on the 8-bit latched video data from the A/D converters. The 8-bit digitized video from latch 321 is corrected or compensated to reduce image quality degradations that would otherwise result from non-uniform illumination of the scanned materials and the vignetting effects of the lens.

The gain correction technique is similar to that described in U.S. Pat. No. 4,639,781 issued on Jan. 27, 1987 to N. M. Rucci and H. O. Sautter. Only corrected picture information is processed for display by PC 320. The correction factors are calculated and applied during the scanning procedure.

As previously noted, microprocessor 305 also controls the movement of the scanner stepper-motor 304. It provides both motor direction signal and step pulse signals over lead 323.

A second I/O port of microprocessor 305 is used to send compensated video data and scanner status and control information to PC 320 and to receive scanner commands from the PC 320 via interface 319. Interface 319 utilizes standard 8-bit bidirectional transceiver/-latch circuits to transfer information between microprocessor 305 and PC 320 in a well-known manner.

While the disclosed document scanner embodiment describes the use of a fluorescent lighting source, obviously an incandescent or other type of lighting source may similarly be utilized. Moreover, the techniques utilized are applicable to other types of document scanners.

Thus, what has been described is merely illustrative of the application of the principles of the present invention. Other methods and circuits can be iplemented by those skilled in the art without departing from the spirit and scope of the present invention.

What is claimed is:

1. An optical scanner for scanning an object and converting an image intensity signal into an electrical signal, said scanner comprising
   means for illuminating said object with an intensity which varies at a periodic rate and
   sensor means for integrating the image intensity signal of said scanned object over a period of said rate, said sensor means beginning at an arbitrary time of the period and ending one time period later.
2. The optical scanner of claim 1 wherein said illumination means and said sensor means are located above a plane formed by said object.
3. The optical scanner of claim 1 wherein said object is transparent and said illumination means is located below said plane and said sensor means is located above said plane.
4. The optical scanner of claim 1 wherein said scanner includes
   means for line scanning the object at a line rate which is an integer multiple of said periodic rate.
5. The optical scanner of claim 1 wherein said rate is the rate of a commercial AC voltage source.
6. The optical scanner of claim 5 further comprising a clock operating at a frequency which is an integral multiple of the rate of said commercial AC voltage source, and wherein
   said period is derived from said clock.
7. The optical scanner of claim 6 wherein
   said clock frequency is derived independently of said commercial AC voltage.
8. The optical scanner of claim 6 wherein
   said clock is phase synchronized to said commercial AC voltage source.

* * * * *

UNITED STATES PATENT AND TRADEMARK OFFICE
CERTIFICATE OF CORRECTION

PATENT NO. : 4,737,857

DATED : April 12, 1988

INVENTOR(S) : Norman M. Rucci, Helmuth O. Sautter, Donald B. Swicker

It is certified that error appears in the above-identified patent and that said Letters Patent is hereby corrected as shown below:

Column 2, Line 46 "203, 204" should read --205, 206--.

Column 4, Line 22 "application" should read --applications--.

Column 4, Line 45 "300" should read --306--.

Column 4, Line 45 "fed directly" should read --fed via lead 300 directly--.

Signed and Sealed this

Thirty-first Day of October, 1989

Attest:

DONALD J. QUIGG

Attesting Officer     Commissioner of Patents and Trademarks